United States Patent [19]

Mimuth et al.

[11] Patent Number: 5,765,031
[45] Date of Patent: Jun. 9, 1998

[54] FAULT TOLERANT OUTPUT STAGE FOR DIGITAL TWO-CONDUCTOR BUS DATA COMMUNICATION SYSTEM

[75] Inventors: Jürgen Mimuth, Eislingen; Oliver Kaufmann, Stuttgart, both of Germany

[73] Assignee: Daimler-Benz AG, Germany

[21] Appl. No.: 597,888

[22] Filed: Feb. 5, 1996

[30] Foreign Application Priority Data

Feb. 3, 1995 [DE] Germany .................. 195 03 460.0

[51] Int. Cl.$^6$ .................. G06F 11/14; G06F 11/16; G06F 11/04
[52] U.S. Cl. .................. 395/183.19; 395/185.09; 395/308; 395/311
[58] Field of Search .................. 395/183.19, 185.09, 395/182.02, 308, 311; 370/217, 220, 284, 285, 276, 296, 225, 228

[56] References Cited

U.S. PATENT DOCUMENTS

| | | | |
|---|---|---|---|
| 4,764,759 | 8/1988 | Braun et al. | 340/653 |
| 5,243,623 | 9/1993 | Murdock | 375/220 |
| 5,357,518 | 10/1994 | Peter | 395/182.02 |

FOREIGN PATENT DOCUMENTS

| | | |
|---|---|---|
| 0 529 602 | 3/1993 | European Pat. Off. . |
| 42 29 175 | 3/1994 | Germany . |
| 3-41841 | 2/1991 | Japan . |
| 6-244846 | 9/1994 | Japan . |

OTHER PUBLICATIONS

"CAN—das sichere Buskonzept," Jens–Ulf Pehrs et al., Elektronik 17/1991.
Patent Abstract of Japan, vol. No. 213 (E–1356), Publication No. JP4–351034, dated 26 Apr. 1993.

"CAN—das sichere Buskonzept," Jens–Ulf Pehrs et al., 2087 Electronik 17/1991, Bd. 40, Nr. 20, Aug. 1991, pp. 96–101.

European Search Report dated Jun. 7, 1996.

Primary Examiner—Robert W. Beausoliel, Jr.
Assistant Examiner—P. Vales
Attorney, Agent, or Firm—Evenson, McKeown, Edwards & Lenahan, P.L.L.C.

[57] ABSTRACT

The invention provides a fault tolerant output stage for a digital two-conductor bus data communication system of the type having a transmission module and a reception stage which contains a bus signal intermediate processing module and a reception module connected downstream that conditions incoming bus signals for a data processing unit which is connected downstream. A state detection module is connected to the bus lines to detect a short-circuit between the bus lines, in which case the transmission module can be switched over between a difference mode of operation and a single-wire mode of operation under the control of the state detection module. The intermediate processing module is configured to condition the bus signals for the reception module automatically or under the control of the state detection module, both in the case of fault free bus lines and in the case of an interruption or short-circuit to the high or low supply voltage of one of the two bus lines and in the case of a short-circuit of the two bus lines to one another.

6 Claims, 3 Drawing Sheets

FAULT TOLERANT OUTPUT STAGE FOR DIGITAL TWO-CONDUCTOR BUS DATA COMMUNICATION SYSTEM

BACKGROUND AND SUMMARY OF THE INVENTION

The invention relates to a fault tolerant output stage for a digital two-conductor bus data communication system.

Output stages of this generic type are used for example within a CAN (Controller Area Network) system in motor vehicles. When equipped with such an output stage, each subscriber terminal of the communication system can communicate with the others via the two-conductor bus with two-way alternate data traffic, using the time-division multiplex method. The two-conductor bus comprises a two-conductor line which runs for example inside a cable harness in the vehicle. In such a two-conductor data bus, failures can occur in the form of cable breaks or short-circuits of the lines to one or another supply voltage level, or in the form of a short-circuit of the two lines to each other.

It is already known to provide measures in such an output stage which permit continued data communication when a so-called single fault (i.e. a single instance of a line fault) occurs, the device then changing from difference operation to single wire operation. In one such arrangement communications are restored after a fault has been detected, under control of a microcontroller connected upstream in the output stages, with the aid of complex software algorithms. Such devices, however, usually require several seconds dead time.

In "CAN—das sichere Buskonzept" (CAN—the reliable bus concept), Elektronik (Electronics) 17/1991, page 96, J. U. Pehrs and H-C. Reuss describe a CAN system in which each subscriber node has a microcontroller which detects bus line faults and accordingly sets the appropriate transmission mode. In this publication, test messages which can be received by all the other subscriber nodes are transmitted from each subscriber node for fault detection. After the test results have been evaluated, each node sets the optimum transmission mode, differential two-wire transmission being accorded priority owing to its known advantages.

German Patent Document DE OS 42 29 175 A1 discloses a bus system in which a microcomputer monitors the transmission of test messages, and can switch the network interface between two-wire operation and single-wire operation as a function of the detected bus line state, via two switching elements provided therein. The microcomputer is connected upstream of a network interface, and is configured for two-wire reception.

European Patent Document EP 0 529 602 A2 discloses a fault tolerant reception stage for a digital two-conductor bus data communication system which can continue the transmission of data without delay even when a single error occurs. For this purpose, the input of the reception stage has a comparator stage which evaluates in a quite specific manner the voltage, levels coming in on the bit lines, in such a manner that the possible operating states of the two conductor data bus can be unambiguously distinguished from one another. Downstream units of the reception stage are configured so that reception of data can be continued without delay, irrespective of whether the two-conductor data bus is operating fault free, or is experiencing a single fault. The comparator stage forms here an intermediate processing stage whose output signals from the subsequent units of the reception stage serve as a basis for acquiring the data information.

The object of the present invention is to provide a fault tolerant output stage of the type mentioned above which automatically switches from two-conductor to single-conductor operation when a single fault occurs, in real time and without additional software outlay. As a result, the output stage according to the invention is capable of carrying on the data communication without delay.

This and other objects and advantages are achieved by the fault tolerant output stage according to the invention, which is divided into a transmission module and a reception stage. The reception stage itself comprises a module for the intermediate processing of incoming bus signals, a reception module and a state detection module. The state detection module makes it possible to detect a single fault in the form of a short-circuit of the two bus lines to one another. For this particular operating state, the intermediate processing module switches the transmission module from a differential two-wire mode of operation to a single-wire mode of operation. For this purpose, an associated control input is provided on the transmission module, which is suitably configured. In all other bus line states, the transmission module can remain in the mode of operation provided for fault free bus lines.

The intermediate processing module is configured so that it conditions the bus signals for the reception module automatically or under the control of the state detection module, both in the case of fault free bus lines and also in the case of an interruption or short-circuit to the high or low supply voltage of one of the two bus lines or a short-circuit of the two bus lines to one another, so that the data information can be passed on to the reception module without delay. The reception module then conditions the intermediately processed data bus signals for a subsequent data processing unit.

In another embodiment of the invention, the transmission module can be switched from the difference mode to the single-wire mode with little outlay on circuitry, by placing the L output in a floating voltage state in the latter mode.

In a further advantageous embodiment, the intermediate processing module is configured according to a difference mode approach, and it is possible to switch it over between two-wire processing and a single-wire processing on the H bus line. The latter mode of operation is selected if a short-circuit has occurred between the two bus lines. Therefore, for switching over, it is favorable to use the output signal of the state detection module, which switches over the mode of operation of the transmission module. The intermediate processing module which is configured in this difference mode reliably filters out high dynamic and static common mode interference, which permits use in data networks subject to a high degree of interference.

According to another feature of the invention, the intermediate processing module is configured in accordance with a dynamic approach relative to ground. For asymmetric difference formation derived from the bus signals, the intermediate processing module has a three-stage design, with an input level adaptation stage, a comparator stage (which further processes the two data bus signals simultaneously and independently of one another with dynamic threshold adjustment) and an output level adaptation stage. So configured, the intermediate processing module is capable of conditioning, automatically and without delay, the data signals present on the bus lines for the subsequent reception module in all modes of operation; that is, during fault free operation, or operation with single fault.

In another advantageous embodiment, the reception module comprises, an inverting comparator with a threshold that is dynamically adjusted to the input signal.

DETAILED DESCRIPTION OF THE DRAWINGS

Figure 1:
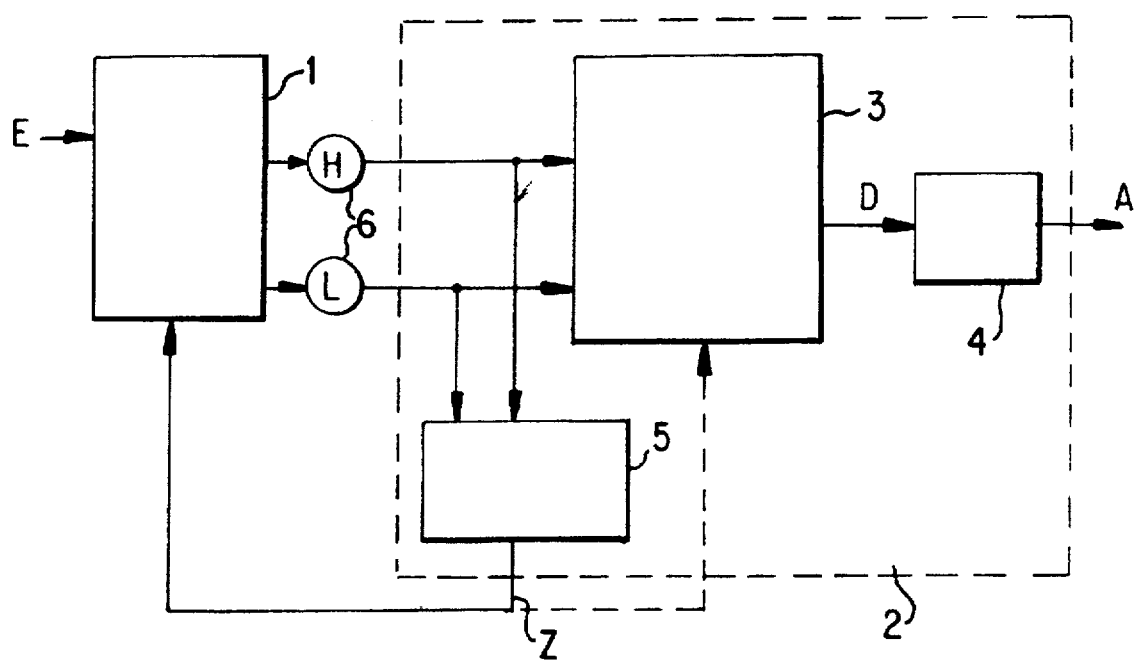
FIG. 1 is a schematic diagram of a fault tolerant output stage for a CAN system of a motor vehicle according to the invention.

FIG. 1 is a block diagram of a fault tolerant output stage according to the invention, which can be used in a motor vehicle for subscriber terminals of a time-division multiplex CAN system. The output stage comprises a transmission module (1) which transfers serial data signals (E), coming in from a data processing unit (not shown), into bus signals for a digital two-conductor bus (6) with an H bus line and an L bus line. A reception stage (2) connected to the two data bus lines (H, L) comprises an intermediate processing module (3) and a reception module (4) connected downstream, as well as a state detection module (5) which is connected, in parallel with the intermediate processing module (3), at the input side to the two data bus lines (H, L). The intermediate processing module conditions the signals coming in on the two bus lines (H, L) for the reception module (4), which is connected downstream and further conditions the intermediately processed signals (D) into signals (A) for a subsequent data processing unit (not shown). The state detection module (5) detects a short-circuit between the two data bus lines (6) to one another and emits a corresponding output signal (Z) indicative thereof.

The output stage of FIG. 1 can automatically maintain data communication via the data bus (6) in real time, both in the case of fault free bus lines (H, L) and also when a single fault occurs in the data bus (6), without need of specific software algorithms. Seven possible single faults are taken into account in this regard; they are: a short-circuit of either the H bus line or of the L bus line to the high or low supply voltage level, an open circuit in one of the two bus lines (H, L), and a short-circuit between the H and L bus lines.

The transmission module (1) is configured so that it can function in a first mode of operation during any of the first six fault states mentioned above, as well as during the fault free data bus state. When a short-circuit occurs between the data bus lines (H, L), on the other hand, transmission module (1) changes into a second mode of operation under the control of the state detection module (5) which detects the short-circuit. In an analogous way, the intermediate processing module (3) is configured so that it is capable of passing the incoming data information to the reception module correctly in each of the eight aforesaid data bus states. In the event of a short-circuit between the bus lines (H, L) it carries on the data transfer either completely automatically or by switching over into another mode of operation, under the control of the state detection module (5), depending on the circuitry.

FIGS. 2 to 8 show examples of the configuration of the individual components of the fault tolerant output stage of FIG. 1, which perform the functions attributed to the respective components. Further details are provided below. The specific dimensioning of the output stage has a working range between 10 kBd and 125 kBd. The bit times are between 8 μs and 100 μs. Other transmission rates can of course be realized by adjusting the dimensioning.

The bus voltage levels are as follows: in the inverted state, the H bus line is connected to 1.75 V with high impedance and the L bus line is connected to 3.25 V with high impedance. In the dominant state, the H bus line is connected to 5 V with low impedance and to 1.75 V with high impedance, and the L bus line is connected to ground with low impedance and to 3.25 V with high impedance. Of course, with the specific dimensioning the offset voltages occurring in the Figures are adapted to the known design principles.

Figure 2:
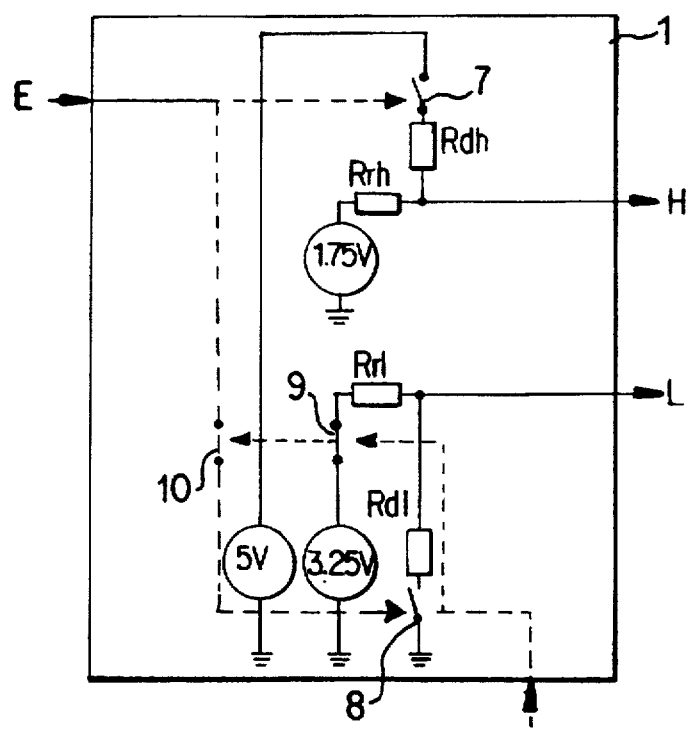
FIG. 2 is a more detailed circuit diagram of a transmission module in the output stage of FIG. 1.

FIG. 2 shows the circuitry of the transmission module (1). The H output is connected to a 1.75 V voltage supply via a high-impedance resistor (Rrh), and to a 5 V voltage supply via a low-impedance resistor (Rdh) and a first drivable switching element (7). The switching element (7) is driven by the incoming signal (E). The L output is connected to ground via a low-impedance resistor (Rd1) and a second drivable switching element (8), and to a 3.25 V voltage supply via a high-impedance resistor (Rr1) and a third drivable switching element (9). An input signal (E) drives the second switching element (8) in synchronism with the first switching element (7) via a fourth drivable switching element (10). The output signal (Z) from the state detection unit (5), fed via a control input, synchronously drives the third switching element (9) and the fourth switching element (10) in the transmission module (1).

This design results in the following method of operation of the transmission module (1). In the absence of a short-circuit between the two data bus lines (H, L), the output signal (Z) of the state detection unit (5) maintains the third switching element (9) and the fourth switching element (10) in the closed position. Depending on the level of the input signal (E), the H output is then connected to 5 V with low impedance and at the same time the L output is connected to earth with low impedance or the H output is connected to 1.75 V with high impedance and the L output is connected to 3.25 V with high impedance. If a short circuit occurs between the two data bus lines (H, L), the state detection unit (5) drives the third switching element (9) and the fourth switching element (10) into the opened state. Thus, in this state the input signal (E) no longer drives the second switching element (8) which therefore remains opened so that the L output is disconnected from ground. On the other hand, the L output is also disconnected from the 3.25 V voltage supply by the opening of the third switching element (9). In this operating state, the H output of the transmission module (1) also has two possible states: a low-impedance connection to 5 V and of a high-impedance connection to 1.75 V, under the control of the input signal (E). Thus, when a short circuit occurs between the bus lines (H, L), the transmission module (1) operates in the so-called single-wire mode, while in the other (fault free) bus line state it operates in the so-called difference mode. In the former case, the data information is transmitted to the H output, and the L bus line assumes the same voltage level due to the short-circuit. In the latter case, on the other hand, complementary voltage levels are applied to the H output and the L output. Of course, the circuitry of the transmission module, in particular the resistors, is dimensioned so that fixed maximum transient recovery times are maintained when changes in voltage level occur.

Figure 3:
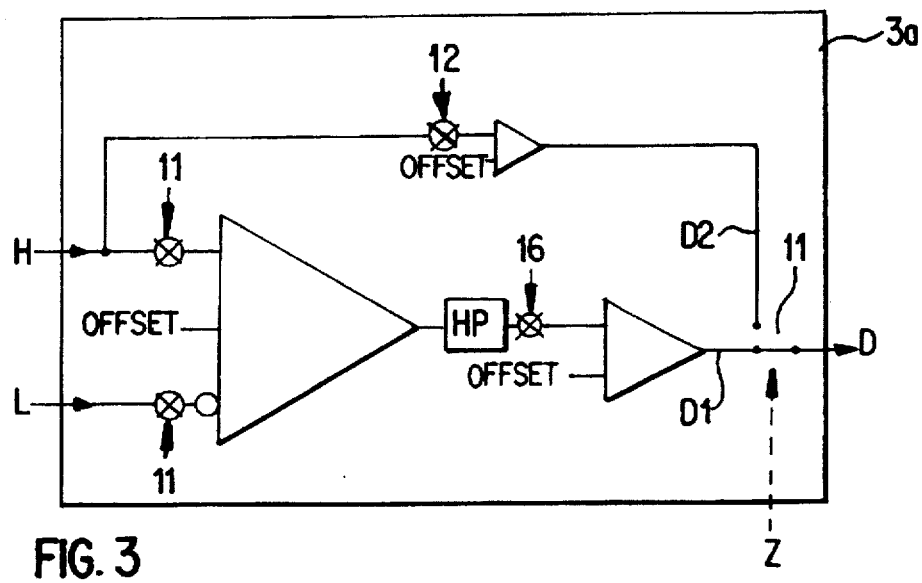
FIG. 3 is a schematic diagram of a an embodiment of an intermediate processing module in the output stage of FIG. 1.
Figure 4:
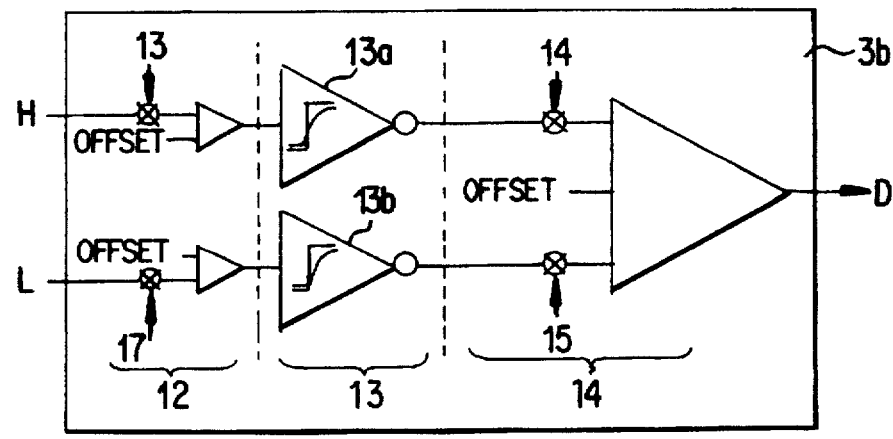
FIG. 4 is a more detailed diagram of a second embodiment of the intermediate processing module in the output stage of FIG. 1.

FIGS. 3 and 4 show two different embodiments of the intermediate processing module (3) in FIG. 1. In both embodiments the respective intermediate processing module is insensitive to common mode interference on the bus lines (H, L) in relation to the reference potential of the electronic system, and can condition the incoming bus signals (H, L) in all eight aforesaid bus line states for further processing in the reception module (4) connected downstream.

The intermediate processing module (3a) illustrated in FIG. 3 is configured to operate in a difference mode, filtering out high dynamic and static common-mode interference, so that it is particularly suitable for use in networks which are subject to a high degree of interference. At its output, a switching element (11) driven by the output signal (Z) of the state detection module (5) switches the intermediate processing module (3a) between two modes of operation. In the position of the switching element (11) shown in FIG. 3, the module operates in a difference mode in which incoming bus signals (H, L) are multiplied at the input by a factor (f1) of ½ for level adaptation, after which the formation of differences takes place. The resulting signal is then subjected to a common mode correction in a high-pass filter (HP), multiplied by a factor (f6) of 2 for level adaptation and offset in a known manner. This constitutes the signal processing for fault free bus lines (H, L) and for single faults of the same, with the exception of a short-circuit between the bus lines (H, L). The acquired signal (D1) is transmitted as an output signal (D) by the switching element (11).

In the case of a short-circuit between the two bus lines (H, L), the state detection unit (5) drives the switching element (11) into the other switched position in which the output signal (D) comprises a signal (D2) acquired from the H bus line alone. For this purpose, the H signal is multiplied by a factor (f2) of ⅙ for level adaptation and is offset in a known manner. The intermediate processing module (3a) with the circuit design according to FIG. 3 is consequently switched over between difference operation and single-wire operation by the state detection module (5).

The embodiment of FIG. 4 adapts automatically, even when the bus lines (H, L) are short-circuited to one another, and thus in all eight aforementioned line states. The intermediate processing module (3b) has a three-stage design with an input level adaptation stage (12), a central comparator stage (13) and an output level adaptation stage (14). In the input level adaptation stage (12), the incoming bus signals (H, L) are multiplied (separately) by a factor (f3) of −⅙ respectively, and a factor (f7) of ⅙ and offset in a known manner. In the subsequent comparator stage (13), the signals which have been pretreated in this way are simultaneously evaluated independently of one another using a comparator (13a, 13b) with dynamic threshold adjustment. Here, the threshold is derived from the quiescent state of the incoming signals in accordance with a suitably selected time constant and a suitably selected voltage interval.

Figure 5:
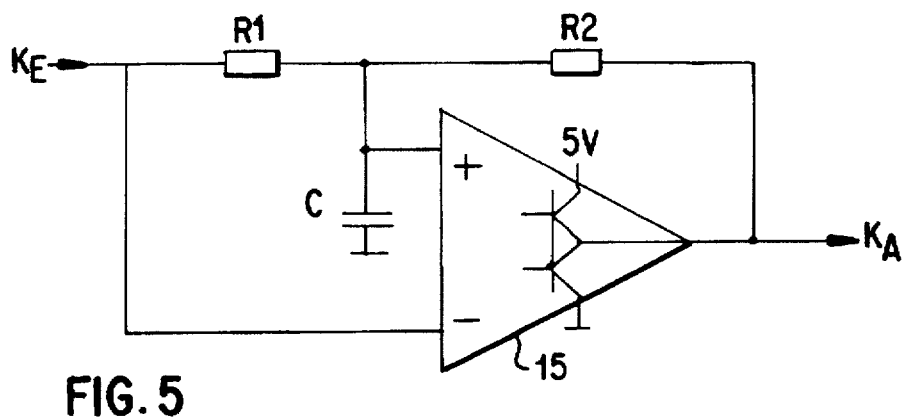
FIG. 5 is a more detailed diagram of a comparator circuit used in the intermediate processing module of FIG. 4.

FIG. 5 shows an embodiment which can be used for the two identical comparators (13a, 13b) of this intermediate processing module (3b) having a comparator IC (15), two resistors (R1, R2) and a capacitor (C). The two resistors (R1, R2) form a voltage divider between the input signal ($K_E$) and output signal ($K_A$). The comparator threshold is derived from the input signal ($K_E$) using this voltage divider. While the inverting input of the comparator IC is supplied directly with the input signal ($K_E$), its noninverting input is connected to the central tap of the voltage divider, and the capacitor (C) is located between this central tap and ground. The adjustment time of the dynamic threshold is determined by the low-pass filter formed comprising the two resistors (R1, R2) and the capacitor (C). Wiring as an invertor permits a simple circuit design.

The two separate output signals of the comparator stage (13) are further processed in the level adaptation stage (14) to form the output signal (D) of the intermediate processing module (3b). For this purpose, the signal associated with the H bus line is initially multiplied by a factor (f4) of ⅓.₅ and the signal associated with the L bus line by a factor (f5) of ½. Thereafter, both signals are added and offset in a known manner. The intermediate processing module (3b) of FIG. 3 can convert an item of incoming data information into an output signal (D), for evaluation in the reception module (4), both in the case of fault free bus lines (H, L) and in the case of any of the seven single errors specified above. In particular, the separate treatment of the pretreated H signal with respect to the pretreated L signal in the terminating level adaptation stage (14) ensures that when a short circuit occurs between data bus lines (H, L) the data information is not lost as a result of the difference forming effect of the intermediate processing module (3b). Therefore, the intermediate processing module (3b) which is configured in this way in a dynamic approach relative to ground does not require any information on the state of the bus line from the state detection unit (5). Rather, it ensures completely independently that the transmission of data is maintained in each of the line states considered. It also reliably filters out in particular small dynamic and static common mode interference, and is thus highly suitable for networks that are subject to a low degree of interference.

Figure 6:
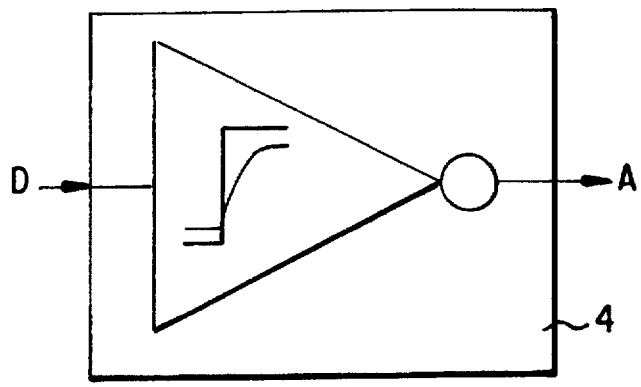
FIG. 6 is a more detailed schematic diagram of a reception stage which is used in the output stage of FIG. 1.

FIG. 6 shows an embodiment of the reception module (4) which transfers the output signal (D) of the intermediate processing unit (3) into an output signal (A) which can be evaluated by a data processing unit connected downstream. This embodiment corresponds identically to the circuit design of each of the two comparators (13a, 13b) of the comparator stage (13) of the intermediate processing module (3b) of FIG. 4. Thus, the reception module (4) according to FIG. 6 comprises a comparator IC, two resistors and a capacitor with the circuit design shown in FIG. 5, and consequently functions as an inverting comparator with a threshold that is dynamically adjusted to the input signal (D).

Figure 7:
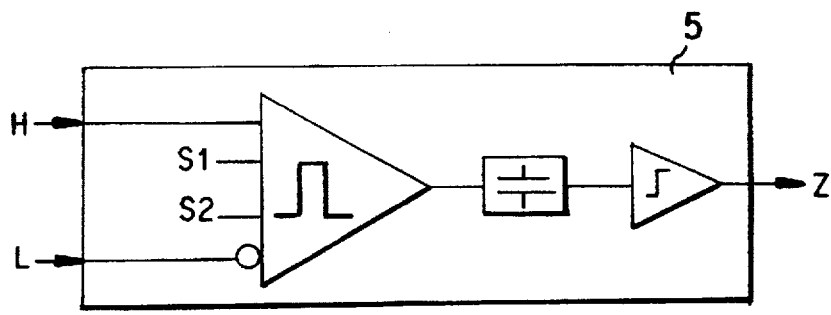
FIG. 7 is a functional diagram of a state detection module used in the output stage of FIG. 1.
Figure 8:
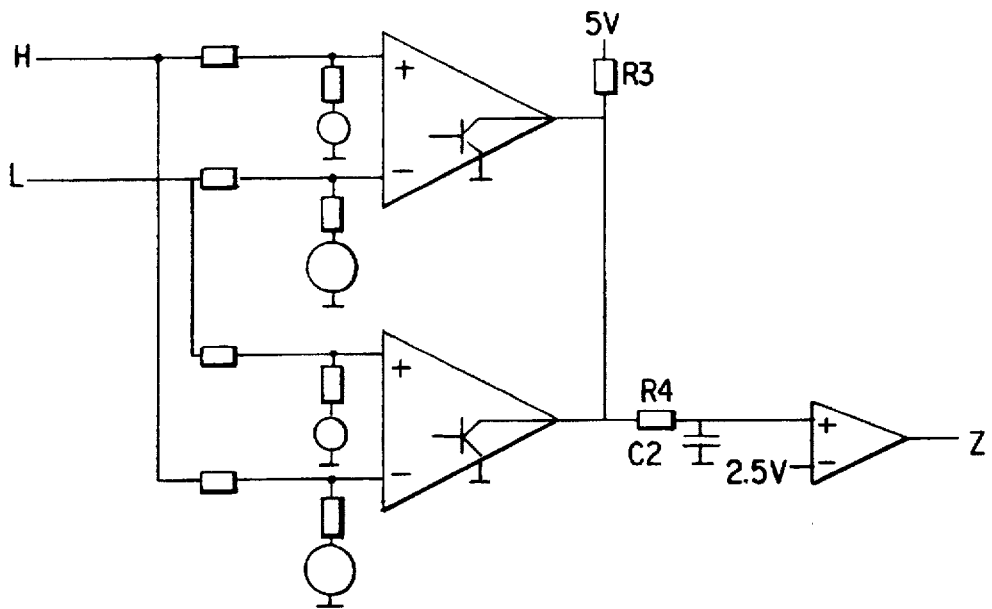
FIG. 8 is a more detailed diagram of the state detection module according to FIG. 7.

FIGS. 7 and 8 show embodiments of the state detection module (5). As can be seen in FIG. 7, this embodiment has an input difference window comparator with two selectable thresholds (S1, S2) and an asymmetric time filtering stage connected downstream. In FIG. 8, the circuit is illustrated more precisely. The difference window comparator component contains one comparator for each threshold (S1, S2), with the incoming H and L bus line signals being input to the one comparator in inverted order relative to the other, via respective resistors. At the same time, both the noninverting and inverting comparator inputs are each connected to a prescribed voltage level via respective resistors. The comparator state is dimensioned for example with respect to the voltage interval between −0.5 V and +0.5 V. For asymmetric time filtering, the comparator signals are combined at the output, and are applied between two resistors (R3, R4) connected in series between a 5 V supply voltage and the noninverting input of a comparator connected downstream. The noninverting comparator input is also connected to ground via a capacitor (C2) while the inverting comparator input is supplied with 2.5 V voltage.

If the difference voltage between the H bus line and L bus line lies within the prescribed window, the capacitor (C2) is slowly charged with a first time constant determined by dimensioning of the first resistor (R3), and if the difference voltage lies outside the window, it is rapidly discharged with a second time constant, determined by the dimensioning of the second resistor (R4) and of the capacitor (2). Typical values for the first time constant are 1 ms and for the second time constant 8 µs. As a result, output signal of the state detection unit (5) indicates whether the difference voltage between the H bus line and the L bus line drops below a prescribed value for longer than the short, second time constant. Thus, it is possible to detect unambiguously a short-circuit between the H bus line and the L bus line.

It is clear from the above description that the fault tolerant output stage shown automatically maintains, in real time and without additional software outlay, the data communication in the CAN system of the motor vehicle not only in the case of fault free bus lines but also when a single fault occurs. In the event of a fault, the output stage automatically switches over from difference operation to single-wire operation. Of course, the output stage is suitable in the same way for other digital data communication systems with a two-conductor bus.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fault tolerant output stage for a digital two-conductor bus data communication system comprising:
   a transmission module coupled to receive incoming serial data signals for conversion into bus signals for first and second bus lines, said transmission module being switchable between a difference mode and a single-wire mode of operation;
   a state detection module connected to said first and second bus lines, which state detection module generates an output signal in the presence of a short-circuit between said first and second bus lines; and
   a reception stage with an intermediate processing module having an input connected to said first and second bus lines for intermediate conditioning of said bus signals, and a reception module connected to an output of said intermediate processing module, for further conditioning the intermediately conditioned bus signals for transmission to a data processing unit connected to an output of said fault tolerant output stage; wherein
   said transmission module switches between said difference mode and said single-wire mode in response to said output signal from said state detection module; and
   intermediate processing module conditions said bus signals for output to the reception module automatically or in response to said output signal from said state detection module, both for fault free operation of said bus lines and in the presence of a single fault in operation of said bus lines, said single fault including one of an open circuit in one of said bus lines, a short-circuit of one said bus line to a fixed potential and a short-circuit between said bus lines.

2. A fault tolerant output stage according to claim 1, wherein the transmission module has at least one switching element which can be driven by the output signal from the state detection module, and by means of which, in a first switched position, said first bus line can be connected at high impedance to an intermediate voltage level and at low impedance to a low voltage level by means of a switching element which can be driven by said input signal, and in a second switched position is disconnected from both voltage levels.

3. A fault tolerant output stage according to claim 1, wherein:
   the intermediate processing module has two modes of operation, including a first mode in which it produces a level-adapted difference signal which is corrected by a DC voltage component from the two bus line signals, and a second mode in which it produces a level-adapted signal from the second bus line; and
   said intermediate processing module is driven between said first and second modes in response to said output signal of the state detection module.

4. A fault tolerant output stage according to claim 1, wherein in order to form asymmetric differences derived from the first and second bus line signals, the intermediate processing module comprises three-stages, including an input level adaptation stage, a comparator stage connected to an output thereof, said comparator stage having concurrently connected comparators with dynamic threshold adjustment connected separately for each bus line, and an output level adaptation stage.

5. A fault tolerant output stage according to claim 1, wherein the reception module comprises a concurrently connected comparator with dynamic threshold adjustment.

6. A fault tolerant output stage according to claim 1, wherein the state detection module comprises a difference window comparator with asymmetric time filtering unit connected downstream.

* * * * *